UNITED STATES PATENT OFFICE.

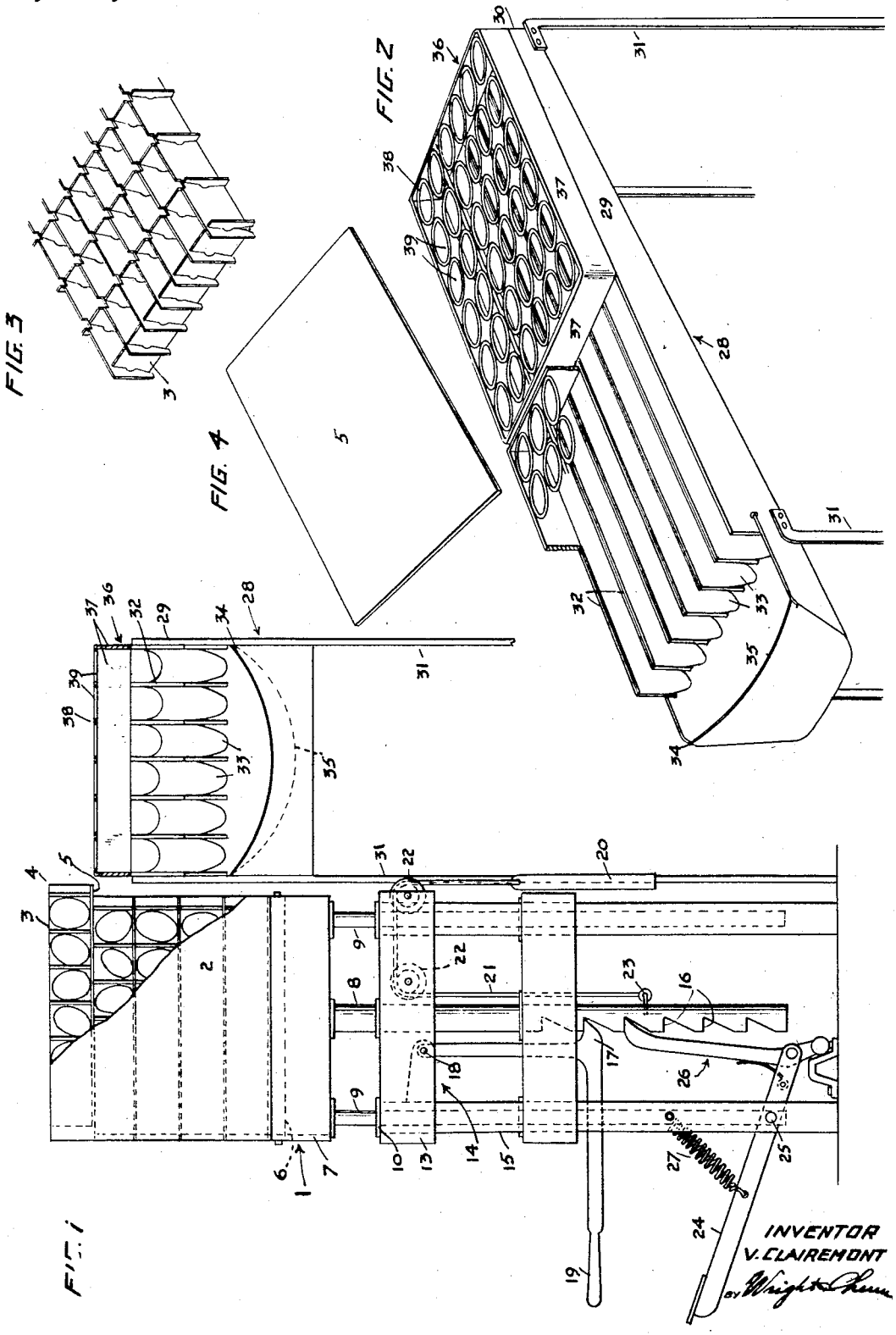

VICTOR CLAIREMONT, OF SAN FRANCISCO, CALIFORNIA.

EGG-GRADER.

1,370,629. Specification of Letters Patent. Patented Mar. 8, 1921.

Original application filed July 26, 1919, Serial No. 313,570. Divided and this application filed March 10, 1920. Serial No. 364,798.

*To all whom it may concern:*

Be it known that I, VICTOR CLAIREMONT, a citizen of the United States, residing at San Francisco, in the county of San Francisco and State of California, have invented new and useful Improvements in Egg-Graders, of which the following is a specification.

This invention relates to improvements in egg grading apparatus and resides primarily in the provision of simply constructed, inexpensive, and compact apparatus by means of which large quantities of eggs may be graded and separated in a reliable and efficacious manner without breaking or cracking the eggs.

An object of the invention is to provide apparatus of the character described in which the grading member retains and supports the select or larger eggs and is in position to be readily moved onto other egg handling apparatus such as egg candling or preserving apparatus, said grading member serving as a basket or tray for the eggs as well as a grading member.

This application is a division of my pending application filed July 26, 1919, Ser. No. 313,570.

The invention possesses other advantages and features, some of which with the foregoing will be set forth in the following description wherein I shall outline in full that form of the invention which I have selected for illustration in the drawings accompanying and forming a part of the present specification. In said drawings I have shown one form of the construction of my invention, but it is to be understood that I do not limit myself to such form, since the invention as expressed in the claims may be embodied in a plurality of forms.

Referring to the drawings:

Figure 1 represents a front elevation of my improved grading apparatus.

Fig. 2 is a fragmentary perspective view of the grading table.

Fig. 3 is a perspective view of an ordinary egg crate filler.

Fig. 4 is a perspective view of a flat used in egg crates between fillers.

In the present embodiment of the invention as illustrated in the drawing, I provide a vertically movable table 1 onto which egg crates 2 are delivered by a suitable conveyer, not shown. Each egg crate includes 10 collapsible fillers 3, there being three dozen eggs in each filler. These fillers are arranged in two vertical rows of five each separated by a partition. Before being delivered to the table or while on the table one side and the top of each crate are removed to permit the filler to be withdrawn horizontally from the crate, the flats 5 acting to support the eggs thus withdrawn.

The table 1 comprises rollers 6 journaled in said bars 7 secured to and resting upon a central supporting post 8, and also provided with four depending guide rods 9. The guide rods are slidably mounted in bearings 10 formed in horizontal bars 13 of a frame 14 on vertical stationary standards or posts 15. The supporting post 8 is provided with notches 16 adapted to be engaged by a dog 17. This dog is pivoted, as at 18, to the frame 14 and has an operating handle 19 extending outwardly therefrom.

A weight 20 is supported on the frame 14 by a rope 21 extending over pulleys 22 and connected to an eye 23 on the post 8. The weight assists in elevating the table 1.

I provide a foot operated lever or treadle 24 for raising the table. This lever is pivoted to a post 15 of the frame 14, as at 25, and actuates a spring pressed pawl 26 against the action of a retractile spring 27. The pawl engages in the notches 16 when the treadle is depressed and raises the post 9 and table 1.

Mounted to one side of the table 1 is a grading table comprising a rectangular frame 28 closed on its sides and at one end by walls 29 and 30 respectively. This frame is mounted on legs or standards 31. A plurality of vertical partitions 32 are mounted lengthwise in the frame and are equi-distantly spaced from one another. From the upper edges of the partitions depends individual canvas or other flexible troughs 33, said troughs being inclined toward the open end of the frame at which point is mounted a container 34 having a flexible bottom 35.

The grading member comprises a bottomless basket or frame 36 of the same horizontal dimensions as the filler and has four sides 37 and a top surface 38 composed of 36 egg grading and supporting openings 39. The openings in this form of the invention may be provided by securing together and to the sides 37 in rows, a plurality of wire rings, the diameter of each ring being $1\frac{1}{16}$ inches. One or more of these baskets are mounted upon the grading table and as the partitions 32 are spaced apart a distance equal to the diameter of the rings, the troughs 33 aline with the rows of rings.

In the operation of the apparatus, a crate of eggs is placed upon the table 1 and the top and one side of the crate are removed as heretofore described, so that the open side of the crate will be disposed opposite to the grading table.

An operator now actuates the lever or treadle 24 so as to raise the table and to bring the uppermost fillers in each series in line, that is, in the same horizontal plane with the upper edge of one of the bottomless baskets 36. When the fillers of the crate are in this position, as shown in dotted lines in Fig. 1 of the drawing, the operator moves the dog 17 into engagement with the notches 16 so as to hold the table and crate of eggs in proper position. Another operator slides the uppermost filler 4 with the flat 5 on to the bottomless basket and then removes the flat from beneath the filler. Eggs having a diameter less than $1\frac{9}{16}$ of an inch drop through the openings 39 into the troughs 33 and owing to the inclination of said troughs, roll downwardly and into the container 34, from the bottom 35 of which container these smaller eggs may be removed and placed in cases to be sold as "seconds." The eggs having diameters greater than one and nine sixteenth inches will be retained and supported by the openings 39. The bottomless baskets thus filled with the selected and graded eggs may be pushed from the grading table on to other suitable egg handling machinery, not shown, such as candling and preserving apparatus, the eggs remaining in the baskets while being operated upon in these other egg handling devices.

After one layer of fillers in a crate has been disposed of, the operator manipulates the apparatus of the table 1 so as to bring the next layer into position to be moved on to the grading table. This operation is carried out until the case of eggs is emptied and another case is deposited upon the table 1 and said table being raised to repeat the operation of grading the eggs. In this way, I may handle a large quantity of eggs and grade them in a reliable and expeditious manner.

I claim:

1. In apparatus of the character described the combination with a movable table adapted to support a case of articles, means for moving said table so that each of a vertical series of fillers containing articles in said case is in succession brought to a pre-determined level, and a bottomless frame onto which the fillers are moved when at said level, said frame containing openings corresponding in number and location with the openings in each filler, said openings being of a size to permit small articles to pass therethrough and to prevent articles of a pre-determined size from passing therethrough.

2. In apparatus of the character described the combination with a movable table adapted to support a case of articles, means for moving said table so that each of a vertical series of fillers containing articles in said case is in succession brought to a pre-determined level, a bottomless frame onto which the fillers are moved when at said level, said frame containing openings corresponding in number and location with the openings in each filler, said openings being of a size to permit small articles to pass therethrough and to prevent articles of a pre-determined size from passing therethrough, and a receptacle under said frame.

VICTOR CLAIREMONT.